Dec. 8, 1936.     T. R. SCOTT ET AL     2,063,346
MANUFACTURE OF ELECTRIC CABLES
Filed June 1, 1932
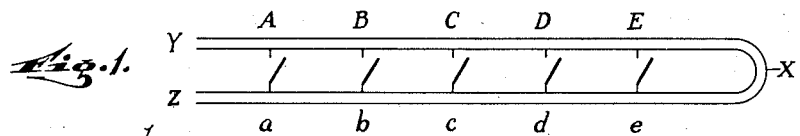
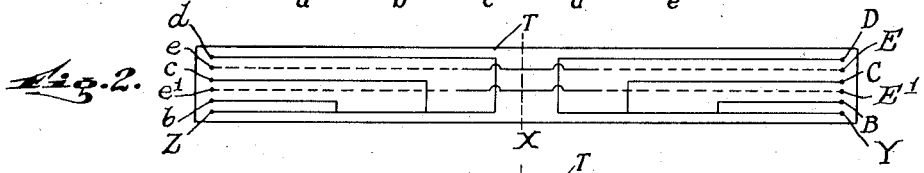
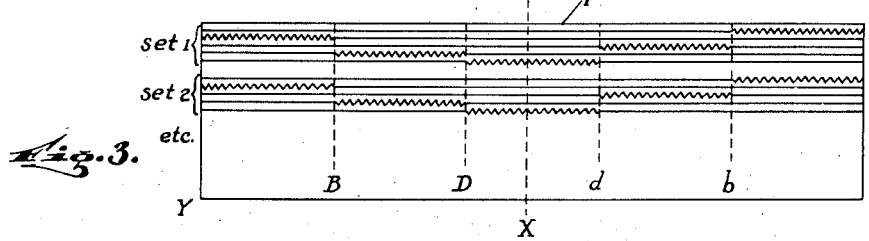
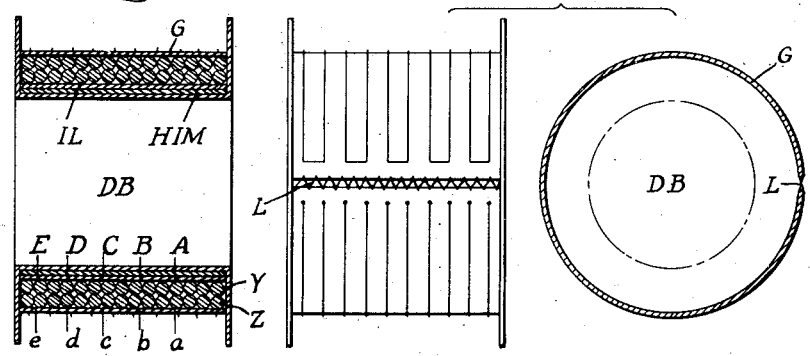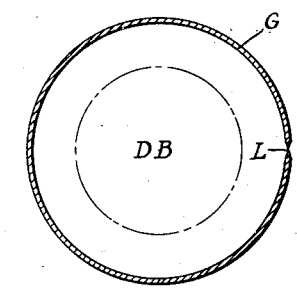
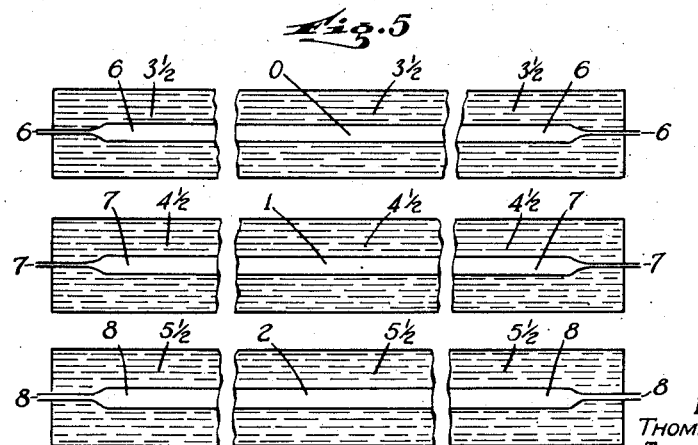
INVENTORS.
THOMAS R. SCOTT
JOHN K. WEBB
BY
ATTORNEY.

Patented Dec. 8, 1936

2,063,346

UNITED STATES PATENT OFFICE 2,063,346

MANUFACTURE OF ELECTRIC CABLES

Thomas Robertson Scott and John Krauss Webb, Aldwych, London, England, assignors to International Standard Electric Corporation, New York, N. Y.

Application June 1, 1932, Serial No. 614,766
In Great Britain June 2, 1931

5 Claims. (Cl. 173—264)

In the manufacture of oil impregnated electric cables it is usual to place the unsheathed cable in a chamber which may be evacuated, and then introduce the oil so that the cable insulation is impregnated therewith. This process is very wasteful, the oil in the chamber must be used over and over again with inevitable introduction of impurities. Moreover, the subsequent process of sheathing tends to reduce the quality of the insulation, and special precautions must be taken to avoid contamination of the insulation by gas (such as air), moisture, etc. It is known that in specially designed cables in which special ducts or channels have been provided and impregnating compound of comparatively low viscosity is employed (e. g. less than 6° engler at 60° C.) satisfactory impregnation can be achieved by introducing the impregnating compound after the lead sheath has been applied. It has been proposed also to introduce the impregnating compound after the lead sheath has been applied to cables which do not include special ducts or channels, and in which the impregnating compound is of normal viscosity, but this has heretofore been found uneconomical on account of the substantially infinite time which would be required to effect perfect evacuation of the cable prior to the introduction of the oil, and also of the great time required to effect the subsequent impregnation which, furthermore, by known means could never be made really complete.

The present invention relates to methods or means for overcoming the aforesaid difficulties in the evacuation and impregnation of a cable after the lead sheath has been applied.

According to the invention there is provided high tension electric cable in which the evacuation and/or impregnation is accelerated by decreasing the effective length of the cable.

According to a feature of the invention the evacuation and/or impregnation of a sheathed cable is accelerated by decreasing the effective length of the cable by tapping the sheath.

The cable may, before the introduction of the oil, be swept with a vapour condensible to liquid or solid at normal cable temperature as described in U. S. Patent 1,941,913, granted January 2, 1934, to Thomas N. Riley.

The time taken in impregnation may be materially reduced and more perfect impregnation obtained by proper temperature control and/or by controlling the pressures outside the cable as will hereinafter be explained.

In particular cases in which impregnating compound is used whose melting point is at a temperature higher than that which may be experienced by the cable during normal service, the compound, may be formed during impregnation after sheathing by applying one component (e. g. wax or jelly) to the dried insulating paper (or esterified paper) before the cable is insulated and, thereafter, impregnating the cable by the methods described herein with an oil of suitable viscosity so that the resultant combination of wax or jelly with oil forms an impregnating compound of the desired physical and electrical characteristics. By means of this device the time of impregnation is substantially reduced, since the volume of compound which flows into the cable is reduced and the rate of flow is also increased in virtue of the lower viscosity of the oil component over that of the resultant compound. In this process it is necessary to regulate the temperature by utilization of the temperature control methods described herein in order that combination of the two components may be effected in a manner which enables the impregnating process after sheathing to be carried out in an economic period of time.

It has been found that the time taken to effect evacuation of a sheathed cable approximates to that given by the formula:—

$$P = \frac{P_0}{1 + \frac{t}{kl^2}}$$

where $P_0$ = initial pressure of gas in the sheathed cable.
$P$ = maximum pressure of gas in the sheathed cable at time $t$.
$l$ = effective length of cable, i. e., maximum distance from pumping station.
$k$ = constant depending on the longitudinal resistance of the cable to gas flow and on the volume of gas per unit of cable.

In cables of the type considered, in which no special provision is made for longitudinal flow (by means of oil-ducts, etc.) $k$ is of comparatively large value. It is necessary also that such cables should be manufactured in lengths of considerable magnitude (of the order of 200 yards to 400 yards). It follows that even if pumping stations be provided at both ends of the length (L) of the cable, so that $2l = L$, the time taken to reduce $P$ to the required value will be inconveniently long. The value of $P$ at the time of admission of the impregnating liquid to the cable has been found to be of considerable importance in determining the quality of the oil-impregnated cable, since the inclusion of gas in the insulation promotes deterioration of the insulation under electrical stress and eventually effects electrical breakdown of the insulation.

Therefore, it is proposed to tap the cable at one or more points, introduce the vacuum at these points and thereby reduce the effective length of the cable. To do this the cable sheath has one or more holes drilled in it at intermediate points and a wiped joint is made to a tube which may be associated with the pump. It is preferable, slightly to distend the lead sheath at the mouth of the tube so as to ensure a free access of air to this point. The distension of the sheath at this point considerably reduces the resistance effect produced by the inevitable interposition of the insulating wrappings between the hole in the sheath and the strand. It has been found that when the tapping is made in this way the resistance from a tapping at the mid-point of a cable to one of the ends may be reduced to 1.08R (where 2R=total resistance of the length), whereas without distension of the lead the value might be of the order of 3R or greater. The impregnation oil may then be introduced at each end of the cable or at as many tapping points as is desired. Preferably, however, after evacuation the tubes are removed by applying heat (a spot welding apparatus may be used) at the mouth of the tube to close the sheath at this point and disconnect the tube which is removed. The impregnation of the cable would then be made in the manner hereinafter described.

Where the oil impregnation of the cable is to be preceded by vapour impregnation the cable is dried before sheathing. A stream of hot dry air is passed through the cable after sheathing (preferably by low pressure suction) from one end, the ends being reversed from time to time. The air supply is then cut off and evacuation commenced. After a predetermined time further drying may be made again introducing a stream of dry air and on cessation of this a vapour is introduced to substitute the air supply. Vacuum is then applied on both ends of the cable and thereafter the impregnating oil may be introduced. If vapour be introduced from both ends of the effective length of the cable in large quantities in a stream of dry warm air, the centre section of the effective length of the cable being cool initially and the whole cable being allowed to cool off thereafter, the vapour will be condensed in the cable and the amount will be graded along the length, the centre portion containing the major amount. When the cable is cool the final evacuation is commenced and heating is also applied. As the temperature of the cable rises, the vapourizable material increases in vapour pressure and the building up of the pressure, particularly on the centre section of the effective length not only dilutes the air but accelerates the process of evacuation. This process may be extended by grading the temperature of the cable so that the temperature falls from the centre of the effective length to the ends at which the pumps are situated so that the vapour pressure of the material will decrease (with partial condensation) as the ends are approached and the pressure gradient forcing air to the ends will be increased. If thereafter the temperature is allowed to rise progressively from the centre towards the ends the pressure gradient (in pressure units per unit of length) can be progressively increased and the evacuation of the residual air accelerated and rendered more efficient.

A modified method of obtaining a concentration of the vaporizable material at the centre of the length is by application of the material in liquid form in the unsheathed cable at the desired position in the length immediately before sheathing. In such cases drying and evacuating operations subsequent to sheathing must be carried out with due care to avoid evacuation of the vapour.

In this method it may be desirable to enclose the applied vapourizable material in containers which have fusible exits, the melting point of the material of which the fusible exit is constructed being at a temperature approximating to that at which the vapour pressure of the vapourizable material becomes appreciable (e. g., 5–10 mm.).

The said containers, which may be of metal, may be introduced into the interstices of the strand or into other convenient points in the structure of the cable prior to sheathing of the cable. The vapourizable material would be one having the required temperature vapour-pressure characteristic. In general, materials with a vapour pressure of 20–30 mm. at a final temperature will be used, e. g., methyl naphthalene v. p. 20 mm. at 120° C.

It has been found that the use of vapour impregnation permits of considerable reduction of the effective length of the cable and thereby reduces the number of tappings required. When oil is introduced at two points in a cable the two streams of oil move towards each other to effect junction and total impregnation, thereby trapping the residual atmosphere contained in the length of cable between the two tappings. If this residual atmosphere be gas a gas pocket will be formed between the two streams in the region of the mid-point of the length of cable between the supply points. This gas pocket will impede the oil flow in virtue of the back pressure generated, and will prohibit total impregnation. It has been proposed above to insert a tapping at the mid-point so that the gas trapped may be pumped off at the said tapping, whereby the effective length for impregnation will be reduced to one half and the time of impregnation will be reduced to approximately one quarter compared with introduction of oil at one point and pumping off of gas at the other. An effect similar to that produced by inserting a tapping may be produced by vapour impregnation. In this case the residual atmosphere trapped between the two streams of oil will consist of vapour which will condense as the two streams of oil approach one another so that the two streams may eventually meet and impregnation may proceed to finality. Thus, when a cable of length $L$ is provided with an odd number of tappings $n$ (auxiliary to the ends of the cable) so that the length of cable between each tapping is $$\frac{L}{(n+1)}$$

the effective length without vapour impregnation will be $$\frac{L}{(n+1)}$$

(since the cable may be fed at the two ends and at alternate tappings provided that a supply tapping is not adjacent to an end), whereas with the impregnation the effective length will be $$\frac{L}{2(n+1)}$$

If, therefore, the effective length required is $$\frac{L}{(n+1)}$$

by means of vapour impregnation it is possible to eliminate $$\frac{n+1}{2}$$

tappings.

N. B.—Cable with two ends plus $n$ (odd tappings).

$$\frac{n-1}{2}+1$$

are suction tappings.

$$\frac{n-1}{2}$$

are supply tappings.
e. g. 6 tappings.

$$\frac{5-1}{2}+1=3$$

suction tappings.

$$\frac{5-1}{2}=2$$

supply tappings (plus the two ends).

The rate of impregnation of oil in the evacuated cable may be still further increased by suitable temperature control. Thus, if a current is circulated in the conductor its temperature and that of the surrounding insulation may be increased, thereby reducing the viscosity of the oil and assisting impregnation. Since the thermal resistivity of evacuated unimpregnated insulation is many times greater than that of impregnated insulation the application of current to the conductor will moreover cause a building up of the temperature longitudinally along the strand so that the fluid resistance per unit length (after oil has progressed some considerable distance down the strand) at the fall of the advancing oil wave is considerably less than the resistance for unit length at the entrance to the cable. This grading of temperature along the length of the cable can be assisted by raising the sheath temperature at some distance from the supply end. The limiting condition is that of the maximum temperature to which the insulation may be submitted with safety. In some cases the thermal resistance across the unimpregnated dielectric may be so small that the circulating current in the conductor causes the copper to reach too high a temperature and in such case the reverse process of sheath heating may be employed, i. e., to give the maximum permissible conductor temperature for the minimum obtainable sheath temperature and the sheath temperature at the supply ends may be raised after impregnation of the ends to maintain the copper temperature at the ends up to the maximum temperature of the sheath consistent with the pressure used.

The control of temperature along the length of the cable may be effected by conductor heating (circulating electric current), or by control of the temperature of the sheath at various sections along the length or by a combination of the two methods of temperature control The invention will be more fully described with reference to the accompanying drawing of which Figure 1 illustrates a cable having a number of tappings. Figures 2 and 3 illustrate various arrangements of heating element circuits in a fibrous tape. Figure 4 shows an arrangement of the cable on a drum according to the invention, and Figure 4a a method by which the outer tape is fitted. Figure 5 shows various conditions schematically of a cable in a pressure tank containing fluid.

The control of temperature of the sheath at various sections along the length can be most conveniently effected by some method of electrical heating. The cable may be immersed in a fluid (gas or liquid) bath which is maintained at any desired temperature level, and one of the following types of electrical heating may be employed to produce the required temperature gradient along the length of the cable. Electrical current (D. C. or A. C.) may be circulated in the sheath which may be equipped with a number of tappings A$a$, B$b$, C$c$, D$d$, E$e$ as illustrated in Fig. 1. Short-circuiting of a pair of tappings will result in the sheath between these tappings cooling off to the basic temperature level of the ambient fluid. For example, the short-circuiting of tapping D$d$ will result in the cooling off of the section of cable DX$d$ where X is the midpoint of the cable, Y and Z being the ends. If the connection E$e$ be made through a resistance a portion of the circulating current will continue to flow round the section DX$d$ and the temperature of this section may be maintained at any desired level (dependent on the value of the resistance employed) between that of the remainder of the length and the basic temperature level of the ambient fluid: In cases in which only two tappings are employed and the length is thus divided into three sections, 3-phase alternating current may be employed and the phases may be unbalanced to give variations in temperature from one section to another. In this case there will be a natural unbalance due to self-induction of the sheath, and this characteristic may be turned to advantage in reducing the heating in one section of the cable by control of the phase rotation. In general, multiphase current may be employed, the number of phases used corresponding to the number of sections into which it is desired to divide the length of cable for variation of longitudinal temperature gradient. It has been found convenient to apply the electrical heating current by means of a fibrous tape e. g. asbestos in which heating elements are situated. Such a tape may be applied as a helical lapping to the sheath. The heating elements may be disposed as shown in Fig. 2, or as shown in Fig. 3, so that adjustment of the heating element circuit at the end of the tape T will result in variation of the heating effect along the length of the cable. In these figures, which are purely diagrammatic, the heating wires are shown exposed although in practice they would be embedded in the fabric of the tape. In Fig. 2, the dotted lines represent low resistance wires and the full lines high resistance wires, whereas in Fig. 3 the high resistance heating elements are shown as zig-zag lines. The use of such a tape introduces advantages over the circulation of current in the sheath itself in that it is not necessary to provide tappings on the sheath at points which may be inaccessible when the cable is wound on a drum. The tape also permits the use of currents at higher voltages (e. g. 220 volts) which are more conveniently used in practice and which allow reduction of the circulating current with consequent reduction in inductive effects. These inductive effects may be further reduced and rendered negligible by the arrangement of the heating element circuits in the tape in the form of well known bifilar windings in which the inductive effects of one conductor are completely cancelled by the inductive effects of a corresponding return conductor. The tape may also include high resistance wires for the measurement of temperature by change of resistance. These wires may be arranged so that the temperature in the region of any section of the length of cable may be determined accurately. In Figs. 2 and 3 the lettering has been arranged on similar lines to that of Fig. 1. Thus the short circuiting of Ee in Fig. 1, as discussed above, results in current continuing to flow in YE and Ze. The analogous action in Fig. 2 is the disconnection of Ee (with its return circuit E'e') from the electrical supply and the switching-in of circuits YD and Zd. In the next stage of cooling YD and Zd are replaced in turn by YC and Zc and then by YB and Zb. In Fig. 3 for simplicity only the tappings B, D, b, d have been shown. In this case the condition analogous to the short-circuiting of Dd in Fig. 1 is that in which all conductors with heating elements situated between D and d are disconnected from the circuit, and current flows in one or more conductors having heating elements situated between YD and Zd. Similarly in a later stage of cooling the condition of short-circuiting Bb in Fig. 1 is obtained in the arrangement shown in Fig. 3 by switching out all conductors with heating elements situated between B and b. Heating elements are represented by wavy lines and the connecting wires by straight lines. As indicated in the diagram a number of sets of heating elements designated respectively Set 1, Set 2, etc., may be provided for connection in parallel. Only two such sets are shown in the drawing although the tape is wide enough to accommodate more. It has also been found that temperature control along the length of the cable may be obtained by applying an inner layer of tape IL of the type described around the barrel of the drum DB upon which the cable is wound and an outer layer or gaiter G over the cable wound on the drum. In this case the cable is arranged on the drum in two layers as shown in Fig. 4. The inner tape IL may be separated from the barrel of the drum DB by a layer of heat insulating material HIM. The circuits of the tape may be arranged to provide an effect similar to that illustrated in Fig. 1, and the sections of the length of the cable have been lettered in a corresponding manner in Fig. 4. The heat generated on the inner tape will be transmitted through the outer layer of cable as well as through the inner layer of cable, but this is immaterial, since the cable is arranged so that corresponding sections of the two halves of the cable length are adjacent. This method of controlling longitudinal temperature is convenient, in that the lapping (and subsequent unlapping) of tape on each length of cable treated is avoided, since the drums used in the process may be permanently equipped with an inner tape IL and may be readily fitted with an outer tape G after the cable has been wound upon the drum by lapping the tape overall or by fitting a garter of the type shown in Fig. 4a the ends of which are connected by lacing at L.

The pressure which may be applied in introducing the impregnating oil depends upon the resistance of the lead sheath to distension. An increase in this pressure may be employed if the cable be immersed in a fluid under pressure so that the pressure difference from within the sheath to without be decreased thereby. It is true that in this way the pressure from without to within will be increased at points on the sheath adjacent to portions of the insulation which are unimpregnated or partially impregnated, since the internal pressure at such points approximates to zero, but it is known that cable sheaths are more resistant to external pressures than to internal pressures. It has been found that a cable sheath which can resist 2½ units internal pressure can resist with equal safety an external pressure of 3½ units. If, therefore, the external pressure be raised one unit the pressure applied to the impregnating oil may be increased by one unit and the process of impregnation will be thereby correspondingly accelerated since the time of impregnation is always inversely proportional to the pressure applied in introducing the impregnating oil. The ambient fluid may be raised in pressure as the impregnation process proceeds, in order that the maximum external to internal pressure may be kept up to the desired value (say 3½ units) and the maximum internal to external pressure at the supply ends may be limited to the safe value (say, 2½ units). This is illustrated schematically in Fig. 5. In the figure, which shows a cable in a pressure tank containing fluid, three conditions are illustrated. The following table explains the diagram for cases P, Q, and R in which the external and internal pressures are raised in steps of one unit:

| Case | External pressure | Maximum internal pressure (at cable ends) | Maximum internal pressure (at cable center) | Maximum pressure external to internal (at center) | Maximum pressure internal to external (at ends) |
|---|---|---|---|---|---|
| P | 3½ | 6 | 0 | 3½ | 2½ |
| Q | 4½ | 7 | 1 | 3½ | 2½ |
| R | 5½ | 8 | 2 | 3½ | 2½ |

Since lead and lead alloy sheaths are more resistant to distension at lower temperatures, it is of definite advantage to maintain the sheath at the lowest practicable temperature and to utilize conductor heating as described above to lower the viscosity of the oil travelling along the conductor while applying the maximum safe pressure to the oil at its introduction.

The permissible rate of cooling of the cable may be increased by a similar graded temperature control. By cooling the sheath before the core (current circulating in the conductor) and by cooling the centre sections before the end sections (current being circulated in the end sections of the sheath, or unequal heating being applied along the length of the cable by tapes on the cable as shown in Figs. 2 and 3 or on the drum as shown in Fig. 4) it is possible to accelerate cooling. It has been found that for a given design of cable of constant length cooled in sections EX and eX, DE and de, CD and cd, BC and bc, etc., as shown in Figs. 1 and 4, the permissible rate of cooling may be accelerated as shown below—

| No. of tappings | Time of cooling |
|---|---|
| | Hours |
| Infinity | 4.50 |
| 20 | 7.32 |
| 5 | 15.84 |
| 3 | 23.40 |
| 1 | 60.8 |

When oil is fed into the cable under pressure during cooling from more than one point it is convenient to have different pressures at one or more of the various inlets so that there is a slight flow from one point to another. Too rapid cooling at points between such feeding points will check this flow and indicate on gauge readings at the inlet points that cooling is proceeding too rapidly.

What is claimed is:

1. A method of manufacturing an oil impregnated electric cable free from longitudinal oil ducts which comprises insulating the cable core with fibrous insulation, forming a metallic sheath about said insulation, tapping the sheath at one or more points, associating exhausting means to said tapped points, causing said means to withdraw air and other gases from the cable, applying impregnating oil of a viscous nature to the cable under pressure, maintaining the temperature of the cable along its length of such value that the temperature of the unimpregnated portion immediately in front of the advancing impregnating oil is greater than the impregnated portion, and controlling the rate of cooling thereof.

2. A method of manufacturing an oil impregnated electric cable free from longitudinal oil ducts which comprises insulating the cable core with fibrous insulation, forming a metallic sheath about said insulation, tapping the sheath at one or more points, associating exhausting means to said tapped points, causing said means to withdraw air and other gases from the cable, applying impregnating oil of a viscous nature to the cable under pressure, maintaining the temperature of the cable along its length of such value that the temperature of the unimpregnated portion immediately in front of the advancing impregnating oil is greater than the impregnated portion and controlling the rate of cooling thereof and subjecting the cable to the action of a vaporizable material whereby air and other gases, free or occluded, are replaced by said material, thus facilitating the exhaustion of the cable.

3. A method of manufacturing an oil impregnated electric cable free from longitudinal oil ducts which comprises insulating the cable core with fibrous insulation, forming a metallic sheath about said insulation, tapping the sheath at one or more points, associating exhausting means to said tapped points, causing said means to withdraw air and other gases from the cable, applying impregnating oil of a viscous nature to the cable under pressure, maintaining the temperature of the cable along its length of such value that the temperature of the unimpregnated portion immediately in front of the advancing impregnating oil is greater than the impregnated portion, and controlling the rate of cooling thereof, associating a material with the fibrous insulation, by suitable temperature regulation causing said material to combine with the oil to produce a compound having predetermined physical and electrical characteristics.

4. A method of manufacturing an oil impregnated electric cable free from longitudinal oil ducts which comprises insulating the cable core with fibrous insulation, forming a metallic sheath about said insulation, tapping the sheath at one or more points, associating exhausting means to said tapped points, causing said means to withdraw air and other gases from the cable, applying impregnating oil of a viscous nature to the cable under pressure, maintaining the temperature of the cable along its length of such value that the temperature of the unimpregnated portion immediately in front of the advancing impregnating oil is greater than the impregnated portion, and controlling the rate of cooling thereof wherein the heating of the cable is effected by applying a multiphase current to the conductor core.

5. A method of manufacturing an oil impregnated electric cable free from longitudinal oil ducts which comprises insulating the cable core with fibrous insulation, forming a metallic sheath about said insulation, tapping the sheath at one or more points, associating exhausting means to said tapped points, causing said means to withdraw air and other gases from the cable, applying impregnating oil of a viscous nature to the cable under pressure, maintaining the temperature of the cable along its length of such value that the temperature of the unimpregnated portion immediately in front of the advancing impregnating oil is greater than the impregnated portion, and controlling the rate of cooling thereof wherein the heating of the cable is effected by passing electric current through certain sections of the cable sheath.

THOMAS ROBERTSON SCOTT.
JOHN KRAUSS WEBB.